US007569633B2

(12) United States Patent
Koizumi

(10) Patent No.: US 7,569,633 B2
(45) Date of Patent: Aug. 4, 2009

(54) MOLDING PHENOLIC RESIN MATERIAL FOR PULLEY, AND METHOD OF USING MOLDING RESIN MATERIAL

(75) Inventor: Koji Koizumi, Tokyo (JP)

(73) Assignee: Sumitomo Bakelite Co. Ltd. (JP)

( * ) Notice: Subject to any disclaimer, the term of this patent is extended or adjusted under 35 U.S.C. 154(b) by 530 days.

(21) Appl. No.: 10/548,765

(22) PCT Filed: Mar. 10, 2004

(86) PCT No.: PCT/JP2004/003103

§ 371 (c)(1),
(2), (4) Date: Sep. 9, 2005

(87) PCT Pub. No.: WO2004/081415

PCT Pub. Date: Sep. 23, 2004

(65) Prior Publication Data

US 2006/0167166 A1    Jul. 27, 2006

(30) Foreign Application Priority Data

Mar. 11, 2003    (JP)    ............................ 2003-064863

(51) Int. Cl.
*F16H 55/00* (2006.01)
*C08K 3/40* (2006.01)
*C08K 3/26* (2006.01)

(52) U.S. Cl. ...................... 524/425; 524/494; 524/566; 474/152; 474/166; 29/892

(58) Field of Classification Search ................. 524/494, 524/425, 566; 474/166, 152; 29/892
See application file for complete search history.

(56) References Cited

U.S. PATENT DOCUMENTS 5,336,713 A * 8/1994 Nagaoka et al. ............. 524/540
5,405,299 A * 4/1995 Kubo et al. .................. 474/205
5,797,819 A * 8/1998 Arai ............................ 474/161
6,265,522 B1 * 7/2001 Brunelle et al. ............. 528/194
6,559,218 B2 * 5/2003 Yazawa et al. ............... 524/494
6,765,051 B2 * 7/2004 Yazawa et al. ............... 524/494
6,838,509 B2 * 1/2005 Shimo et al. ................. 524/447
2002/0086930 A1    7/2002 Yazawa et al.

FOREIGN PATENT DOCUMENTS

| EP | 0590233 | * | 4/1993 |
| EP | 0590233 | A | 4/1994 |
| EP | 0794361 | * | 2/1997 |
| EP | 0794361 | A | 9/1997 |
| EP | 1219681 | * | 12/2001 |
| EP | 1219681 | A | 7/2002 |
| JP | 08-159244 | * | 6/1996 |
| JP | 08-198916 |   | 8/1996 |
| JP | 2001-187958 |   | 7/2001 |
| JP | 2002-212388 |   | 7/2002 |

* cited by examiner

*Primary Examiner*—Lorna M Douyon
*Assistant Examiner*—Amina Khan
(74) *Attorney, Agent, or Firm*—Smith, Gambrell & Russell

(57) ABSTRACT

A resin molding material for making pulleys containing a novolac type phenolic resin, a glass fiber, an inorganic substrate other than the glass fiber, and an elastomer is described. The novolac type phenolic resin, ranges from 25% by weight to 45% by weight, the glass fiber together with the inorganic substrate other than the glass fiber ranges from 45% by weight to 65% by weight, and the elastomer ranges from 0.5% by weight to 5% by weight, relative to the entire molding material and are blended together. As the inorganic substrate other than the glass fiber, for example, calcium carbonate is used. As the elastomer, for example, NBR is used. The phenolic resin molding material is molded to obtain a resin pulley.

6 Claims, 1 Drawing Sheet

MOLDING PHENOLIC RESIN MATERIAL FOR PULLEY, AND METHOD OF USING MOLDING RESIN MATERIAL

TECHNICAL FIELD

The present invention relates to a phenolic resin molding material for a pulley, a resin pulley, and a method for using the resin molding material.

BACKGROUND ART

Resin pulleys are commonly used as components of industrial machines or automobiles because they are light in weight and capable of lowering noises and lowering costs, compared to metallic pulleys. Among such resin pulleys, a pulley made of phenolic resin is more frequently used because it has advantages over a pulley made of thermosetting resin, typically of nylon that dimension accuracy is improved and deformation is less likely to occur.

A pulley made of phenolic resin is requested to have mechanical strength, dimension reliability, and thermal shock resistance. Also a pulley made of phenolic resin is requested to have characteristics appropriate for its fixing manner. When a pulley is fixed by using a bolt, the pulley is requested to have excellent stress relaxation from the view point of preventing the bolt from loosing. On the other hand, when a pulley is fixed by introducing an insert inside the pulley, a crack may occur in the vicinity of the insert due to a difference in thermal expansion between the insert and the resin. For this reason, an excellent thermal shock resistance is required. Thus in a pulley made of phenolic resin, it is necessary to achieve a good balance among a variety of required properties at a high-dimensional level.

Conventionally, a fixing method by introducing an insert into a pulley made of phenolic resin is often employed. In this case, an excellent thermal shock resistance is required as described above. For addressing this, a glass fiber is blended into a phenolic resin in a phenolic resin molding material for pulley in order to improve the thermal shock resistance, the mechanical strength and the dimension reliability. Patent document 1 describes mixing a phenolic resin, an elastomer, an organic fiber, a glass fiber, and a powder silica, thereby obtaining an effect of improving the heat shock resistance.

Patent document 1: Japanese Patent Application Laid-Open No. 2001-187958

DISCLOSURE OF THE INVENTION

The above prior arts insist that heat shock resistance can be improved, however, there is a room for improvement in stress relaxation. Accordingly, there arises an object to be solved for achieving a good balance of mechanical strength, dimension reliability, stress relaxation and thermal shock resistance at high level in a pulley made of phenolic resin, particularly, a phenolic resin pulley to be fixed by a bolt, which is used as a component for industrial machines or for automobiles.

The present invention was devised in consideration of the above circumstance, and it is an object of the present invention to provide a phenolic resin molding material for resin pulley having excellent mechanical strength, stress relaxation, thermal shock resistance, and to provide a resin pulley molded therefrom.

The present invention provides a phenolic resin molding material for pulley, obtainable by blending ingredients including (A) novolac type phenolic resin, (B) glass fiber, (C) inorganic substrate (other than glass fiber), and (D) elastomer, wherein proportions relative to the entire resin molding material of the ingredients are: (A) in the range of 25% by weight to 45% by weight, sum of (B) and (C) in the range of 45% by weight to 65% by weight, and (D) in the range of 0.5% by weight to 5% by weight.

Since the resin molding material according to the present invention includes a novolac type phenolic resin, it sufficiently ensures the stress relaxation characteristic. Furthermore, since it includes the glass fiber, the mechanical strength can be ensured. Additionally, since it essentially contains the elastomer and the inorganic substrate other than the glass fiber, the thermal shock resistance is improved. By containing combination of these materials in the proportions as described above, it is possible to realize a resin molding material achieving a good balance of the mechanical strength, the thermal shock resistance and the stress relaxation.

In the resin molding material according to the present invention, the (C) inorganic substrate may comprise at least calcium carbonate. By using calcium carbonate as the (C) inorganic substrate, it is possible to further improve the thermal shock resistance by virtue of the synergistic effect of the calcium carbonate and the elastomer.

In the resin molding material according to the present invention, the (C) inorganic substrate other than the glass fiber may substantially consist of calcium carbonate. In the present description, the phrase "inorganic substrate substantially comprises calcium carbonate" means, for example, the fact that the ratio of calcium carbonate relative to the entire inorganic substrate is not less than 90% by weight. This allows further improvement of the thermal shock resistance.

In the resin molding material according to the present invention, the (D) elastomer may comprise a diene rubber. In the present invention, the diene rubber may be acrylonitrile butadiene rubber.

In the resin molding material according to the present invention, the (D) elastomer may comprise polyvinyl acetal. In the present invention, the polyvinyl acetal may be polyvinyl butyral.

In the resin molding material according to the present invention, the (C) inorganic substrate may substantially consist of calcium carbonate, the (D) elastomer may substantially consist of acrylonitrile butadiene rubber, and the proportions of these ingredients relative to the entire resin molding material may be: (A) in the range of 25% by weight to 33% by weight, (B) in the range of 25% by weight to 35% by weight, (C) in the range of 25% by weight to 35% by weight, and (D) in the range of 0.5% by weight to 2% by weight. This satisfactorily ensures improvement of the stress relaxation by addition of calcium carbonate. Therefore, it is desirably used as a resin molding material which is principally intended for improvement of stress relaxation characteristic.

In the resin molding material according to the present invention, the (C) inorganic substrate may substantially consist of calcium carbonate, the (D) elastomer may substantially consist of acrylonitrile butadiene rubber, and the proportions of these ingredients relative to the entire resin molding material may be: (A) in the range of 33% by weight to 42% by weight, (B) in the range of 45% by weight to 55% by weight, (C) in the range of 2% by weight to 12% by weight, and (D) in the range of 1% by weight to 3% by weight. Accordingly, it is desirably used as a resin molding material which is principally intended for improvement of heat cycle characteristics.

The present invention also provides a resin pulley molded from the resin molding material. The resin pulley of the present invention is excellent in mechanical strength, thermal shock resistance and stress relaxation.

The present invention also provides a method for using a resin molding material in which the resin molding material is used in molding a resin pulley. The phenolic resin molding material for pulley according to the present invention is a molding material which is superior in mechanical strength, thermal shock resistance and stress relaxation to conventional phenolic resin molding materials for pulley. This allows application to a variety of pulleys used as components for industrial machines and components for automobiles.

BRIEF DESCRIPTION OF THE DRAWINGS

The objects, other objects, features and advantages as described above will be more apparent with reference to the description of following preferred embodiments and drawings associated thereto.

BEST MODE FOR CARRYING OUT THE INVENTION

Figure 1:
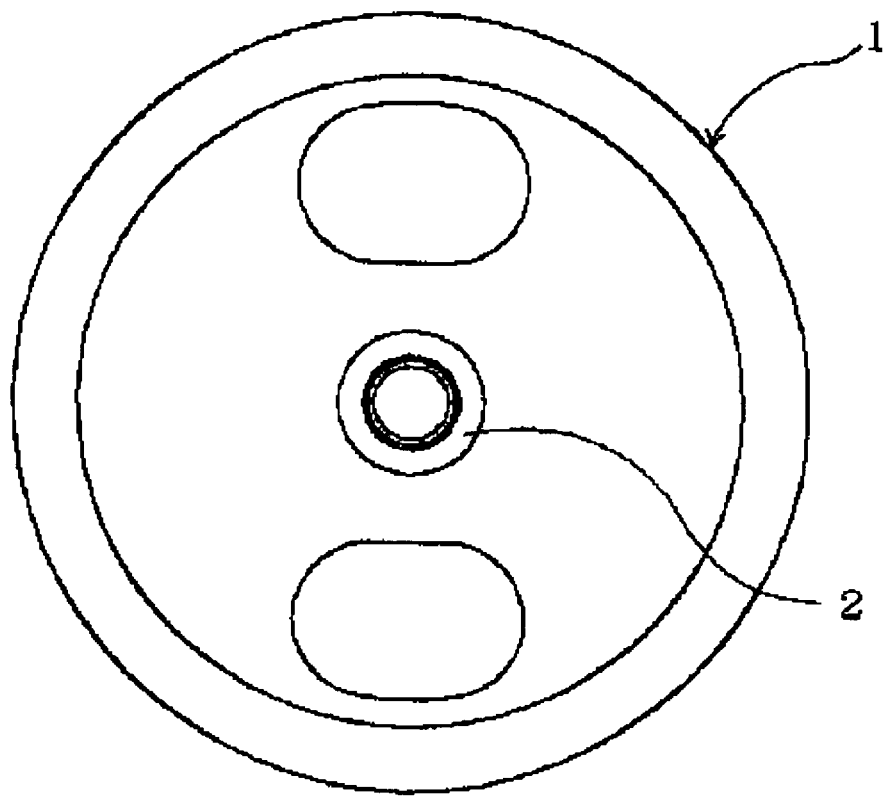
FIG. 1 is a front view showing a constitution of a pulley made of phenolic resin according to the present embodiment.

The phenolic resin molding material for pulley according to the present invention essentially comprises:
(A) novolac type phenolic resin,
(B) glass fiber,
(C) inorganic substrate (other than glass fiber), and
(D) elastomer.

The amounts of the ingredients (A) to (D), on the basis of the entire phenolic resin molding material for pulley may be as follows: (A): 25 to 45% by weight, sum of (B) and (C): 45 to 65% by weight, and (D): 0.5 to 5% by weight.

In the following, explanation will be made on each ingredient constituting the phenolic resin molding material for pulley according to the present invention.

In the present invention, novolac type phenolic resin is used as the (A) phenolic resin. The novolac type phenolic resin is used because it has high cross-linking density, and is excellent in stress relaxation and low in cost. The blending amount of the novolac type phenolic resin is in the range of 25% by weight to 45% by weight, preferably in the range of 27% by weight to 37% by weight, relative to the entire molding material. If the blending amount is too small, the elasticity increases and the tensile elongation percentage decreases, to cause a decrease in thermal shock resistance, and the moldability deteriorates due to the reduced content of the resin. If the blending amount is too large, the stress relaxation decreases, the coefficient of thermal expansion increases, the thermal shock resistance decreases, and the dimensional change due to molding shrinkage increases, with the result that characteristics which are satisfactory for a resin pulley are difficult to be achieved.

In the phenolic resin molding material for pulley according to the present invention, a curing agent that cures the (A) novolac type phenolic resin may be contained. As the curing agent, curing agents that are commonly used in novolac type phenolic resins can be used. Examples of such curing agents include hexamethylenetetramine, resol type phenolic resins and the like. When hexamethylenetetramine is used as a curing agent, it may be used, for example, in an amount ranging from 14 parts by weight to 20 parts by weight, relative to 100 parts by weight of the novolac type phenolic resin.

The phenolic resin molding material for pulley according to the present invention essentially comprises a fibrous inorganic filler. This fibrous inorganic filler contains no organic fibers. As such a fibrous inorganic filler, for example, (B) glass fiber is used. The (B) glass fiber is blended so as to impart a mechanical strength to the molded product. The characteristic of the (B) glass fiber is, for example, but not particularly limited, from 10 µm to 15 µm in fiber diameter and from 1 mm to 3 mm in fiber length. As a result of this, it is possible to realize a desirable operability in producing a molding material, as well as a desirable mechanical strength of the molded product.

The adding amount of the (B) glass fiber may be, for example, 20% by weight or more, relative to the entire molding material. This ensures sufficient mechanical strength. Accordingly, it is possible to improve the strength of the pulley on which high loads exert. Also, a pulley with reduced thickness and reduced weight can be realized.

Examples of the (C) inorganic substrate used in the present invention include, but are not particularly limited to, carcined clay, uncarcined clay, wollastonite, talc, calcium carbonate, mica, and whisker of potassium titanate. Among these, for example, calcium carbonate or wollastonite, especially calcium carbonate is preferably used. As the (C) inorganic substrate, substantially only calcium carbonate may be used. Accordingly, it is possible to obtain a phenolic resin molding material for resin pulley having excellent mechanical strength, stress relaxation, thermal shock resistance more stably. When calcium carbonate is used, the average particle size is, for example, in the range of 0.5 µm to 20 µm, preferably in the range of 1 µm to 10 µm.

The adding amount of the (C) inorganic substrate may be, for example, not less than 1% by weight, preferably not less than 3% by weight, relative to the entire molding material. This securely improves the balance of the mechanical strength, the stress relaxation, and the thermal shock resistance. The adding amount may be, for example not more than 50% by weight, preferably not more than 40% by weight, relative to the entire molding material 50% by weight. This ensures sufficient mechanical strength.

The blending amount of the sum of (B) glass fiber and the (C) inorganic substrate may be, for example, not less than 45% by weight, preferably not less than 50% by weight, relative to the entire molding material. This ensures sufficient stress relaxation and prevents the bolt that fixes the pulley from loosing. Also, it is possible to prevent the coefficient of thermal expansion from increasing, and improve the thermal shock resistance.

The blending amount of the sum of (B) glass fiber and the (C) inorganic substrate may be, for example, not less than 65% by weight, preferably not less than 62% by weight, relative to the entire molding material. This allows decrease in the elasticity and increase in tensile elongation percentage. Consequently, sufficient toughness is ensured, and the thermal shock resistance is improved. Also, the operability in kneading the molding material is improved.

The (D) elastomer used in the present invention is blended so as to improve the thermal shock resistance. Although the kind of the elastomer is not particularly limited, the examples of the elastomer include diene rubbers such as acrylonitrile butadiene rubber (NBR), modified NBR, chloroprene rubber and styrene butadiene rubber; non-diene rubbers such as ethylene propylene rubber; polyvinyl acetals such as polyvinyl butyral (hereinafter, referred to as "PVB"); carboxylic acid vinyl esters such as vinyl acetate; and the like, and these may be used solely or in combination. Among these, for example, nitrile rubbers such as NBR and carboxylic acid modified NBR are preferably used. These materials are excellent in compatibility with a phenolic resin. Therefore, using these materials, it is possible to uniformly disperse the elastomer in the phenolic resin. Accordingly, more excellent toughness is realized, and it is possible to further improve the thermal shock resistance of the resin molding material.

Also, by using a nitrile rubber such as NBR and carboxylic acid modified NBR or a PVB together with a novolac type phenolic resin, it is possible to further improve the balance of the mechanical strength, the thermal shock resistance, and the stress relaxation.

The blending amount of the (D) elastomer is an important factor for realizing a resin molding material having a good balance of the mechanical strength, the thermal shock resistance and the stress relaxation. The blending amount of (D) elastomer may be not less than 0.5% by weight, preferably not less than 1% by weight relative to the entire molding material. This ensures sufficient tensile elongation percentage. Hence, it is possible to ensure a sufficient toughness, and improve the thermal shock resistance.

The blending amount of the (D) elastomer may be not more than 5% by weight, preferably not more than 3% by weight, relative to the entire molding material. This prevents the stress relaxation and the mechanical strength from deteriorating and decreases the coefficient of thermal expansion. Therefore, it is possible to improve the thermal shock resistance.

In the present invention, fillers other than the above may be blended as is necessary.

The composition of the phenolic resin molding material according to the present invention may be adjusted depending on the particular use. For example, as the resin molding material which is principally intended for improvement of the stress relaxation characteristic, the followings can be exemplified. Herein, a blending proportion of each ingredient is based on the entire phenolic resin molding material.

Novolac type phenolic resin: in the range of 25% by weight to 33% by weight,

Hexamethyltetramine: in the range of 3% by weight to 7% by weight

Glass fiber: in the range of 25% by weight to 35% by weight

Calcium carbonate: in the range of 25% by weight to 35% by weight

NBR: in the range of 0.5% by weight to 2% by weight

As the resin molding material which is principally intended for improvement of heat cycle characteristics, the followings can be exemplified. Herein, a blending proportion of each ingredient is based on the entire phenolic resin molding material.

Novolac type phenolic resin: in the range of 33% by weight to 42% by weight,

Hexamethyltetramine: in the range of 3% by weight to 7% by weight

Glass fiber: in the range of 45% by weight to 55% by weight

Calcium carbonate: in the range of 2% by weight to 12% by weight

NBR: in the range of 1% by weight to 3% by weight

By employing such blending proportions, it is possible to further improve the heat cycle characteristics by virtue of the synergistic effect between the glass fiber and the acrylonitrile butadiene rubber.

The phenolic resin molding material of the present invention is produced by techniques known in the art. For example, in addition to the above ingredients, a curing auxiliary agent, a mold release agent, a pigment, a coupling agent and the like are blended as necessary and mixed to uniformity, and then melt-kneaded under heat by means of a single kneader such as a roller, a co-kneader or a twin-screw extruder, or by combination of a roller and other kneader, followed by granulation or grinding, to obtain the objective material.

Next, explanation will be made on the pulley made of phenolic resin of the present invention. The resin pulley of the present invention is produced by molding the aforementioned molding material.

Figure 2:
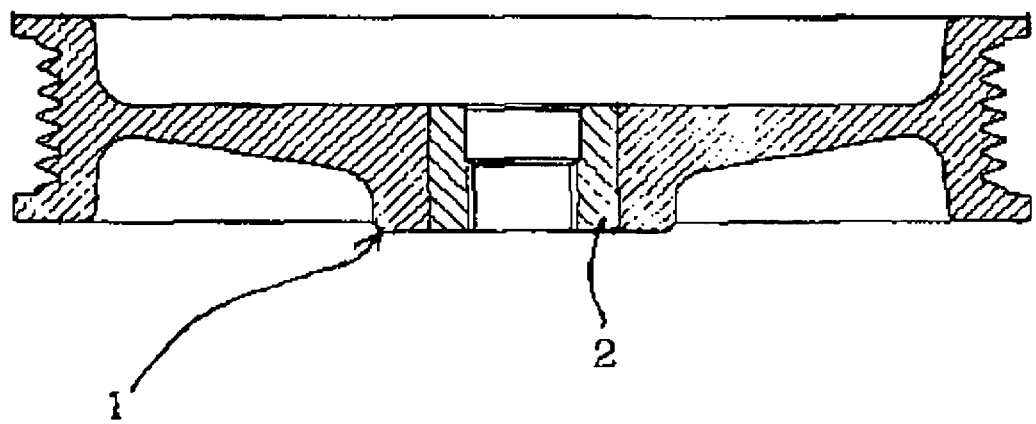
FIG. 2 is a side view of the pulley made of the phenolic resin as illustrated in FIG. 1.

FIGS. 1 and 2 show one example of a structure made of a phenolic resin of the present invention. FIG. 1 is a front view of a pulley made of phenolic resin. FIG. 2 is a side view of the pulley made of phenolic resin illustrated in FIG. 1. In the pulley made of phenolic resin shown in FIGS. 1 and 2, an insert metal piece 2 is fitted into the pulley. A pulley 1 is formed with a fitting part into which the insert metal piece 2 fits; an outer cylindrical part having a V-shaped groove; and a rib that connects the fitting part and the outer cylindrical part.

The pulley made of phenolic resin of the present invention is usually obtained by compression molding, transfer molding, injection molding or injection compression molding using a molding material of the aforementioned formulation while centrically placing a metallic insert. The molding may be conducted, in a molding condition of: mold temperature of 170 to 190° C., molding pressure of 100 to 150 kg/cm$^2$, and curing time of 1 to 5 minute(s), when compression molding is employed. However, the condition is not particularly limited to this.

Since the pulley made of phenolic resin of the present invention is produced by using the aforementioned phenolic resin molding material, it achieves a good balance of the mechanical strength, the thermal shock resistance and the stress relaxation.

EXAMPLES

The present invention will be explained by way of examples and comparative examples. Mixtures of the formulations shown in Tables 1 and 2 were kneaded with heating rollers of different rotation speeds, and formed into sheets and cooled. These sheets were grinded to obtain granular phenolic resin molding materials.

The blended ingredient used in examples and comparative examples are as follows.
(1) Resol type phenolic resin was produced according to the following formulation.
   A reaction vessel equipped with a reflux condenser stirrer, a heating device and a vacuum dehydrator was charged with phenol (P) and formaldehyde (F) in a molar ratio (F/P) of 1:7, and then added with 0.5 parts by weight of zinc acetate per 100 parts by weight of phenol. This reaction system was adjusted to pH 5.5, and allowed for refluxing reaction for 3 hours. Then the reaction was subjected to steam distillation at 100° C. for 2 hours under a degree of vacuum of 100 Torr, to remove unreacted phenol. Then, the reaction was allowed to react for one hour at 115° C. under a degree of vacuum of 100 Torr, to obtain a solid of dimethylene ether type resol type phenolic resin having a number average molecular weight of 800.
(2) Novolac type phenolic resin: number average molecular weight of 700 (A-1082, from Sumitomo Bakelite Company Limited)
(3) Hexamethyltetramine: Hexamine from Mitsubishi Gas Chemical Company Inc.
(4) Glass fiber: Chopped strand with fiber length of 3 mm and fiber diameter of 11 μm from Nippon Sheet Glass Co., Ltd.
(5) Calcium carbonate: SS 80 with average particle size of 2.6 μm from Nitto Funka Kogyo K.K.
(6) Clay: Insulite® from Mizusawa Industrial Chemicals, Ltd.

(7) Curing auxiliary agent: magnesium oxide
(8) Mold release agent: calcium stearate
(9) Coloring agent: carbon black
(10) PVB: S-LEC BX-5 from Sekisui Chemical Co., Ltd.
(11) NBR: PNC-38 from JSR Corporation (iii) Stress relaxation: Stress relaxation test was conducted based on ASTE F38B. A test was conducted at a test temperature of 100° C. and a clamping stress of 11.8 MPa, and a percentage of retaining fraction was measured after 100 hours from the start of the test.

TABLE 1

|  | EXAMPLE 1 | EXAMPLE 2 | EXAMPLE 3 | EXAMPLE 4 | EXAMPLE 5 | EXAMPLE 6 |
|---|---|---|---|---|---|---|
| FORMULATION wt. % | | | | | | |
| NOVOLAC TYPE PHENOL RESIN | 31 | 30 | 29 | 31 | 31 | 35 |
| HEXAMETHYLENETETRAMINE | 5 | 5 | 5 | 5 | 5 | 5 |
| GLASS FIBER | 30 | 27 | 31 | 50 | 30 | 50 |
| CALCIUM CARBONATE | 30 | 33 | 31 | 10 | — | 5 |
| CLAY | — | — | — | — | 30 | — |
| NBR | 1 | 2 | — | 1 | 1 | 2 |
| PVB | — | — | 1 | — | — | — |
| CURING AUXILIARY AGENT | 1 | 1 | 1 | 1 | 1 | 1 |
| COLORING AGENT | 1 | 1 | 1 | 1 | 1 | 1 |
| MOLD RELEASE AGENT | 1 | 1 | 1 | 1 | 1 | 1 |
| CHARACTERISTICS | | | | | | |
| BENDING STRENGTH (MPa) | 145 | 140 | 140 | 160 | 135 | 180 |
| COEFFICIENT OF LINEAR EXPANSION (ppm) | 24 | 25 | 24 | 22 | 24 | 24 |
| STRESS RELAXATION (%) | 85.0 | 82.0 | 85.0 | 84.0 | 87.0 | 82.0 |
| COLD HEAT SHOCK | 150 | 175 | 150 | 200 | 50 | 200 |

TABLE 2

|  | COMPARATIVE EXAMPLE 1 | COMPARATIVE EXAMPLE 2 | COMPARATIVE EXAMPLE 3 | COMPARATIVE EXAMPLE 4 |
|---|---|---|---|---|
| FORMULATION wt. % | | | | |
| RESOL TYPE PHENOL RESIN | 36 | — | — | — |
| NOVOLAC TYPE PHENOL RESIN | — | 31 | 26 | 47 |
| HEXAMETHYLENETETRAMINE | — | 5 | 4 | 8 |
| GLASS FIBER | 30 | 30 | 30 | 20 |
| CALCIUM CARBONATE | 30 | 30 | 30 | 20 |
| CLAY | — | — | — | — |
| NBR | 1 | — | 7 | 2 |
| PVB | — | — | — | — |
| CURING AUXILIARY AGENT | 1 | 1 | 1 | 1 |
| COLORING AGENT | 1 | 1 | 1 | 1 |
| MOLD RELEASE AGENT | 1 | 1 | 1 | 1 |
| CHARACTERISTICS | | | | |
| BENDING STRENGTH (MPa) | 140 | 150 | 110 | 130 |
| COEFFICIENT OF LINEAR EXPANSION (ppm) | 28 | 24 | 35 | 45 |
| STRESS RELAXATION (%) | 68.0 | 86.0 | 70.0 | 65.0 |
| COLD HEAT SHOCK | 200< | 25 | 100 | 100 |

A molding method of test specimens used for evaluating characteristics and an evaluating method are as follows.

(i) Bending strength test was conducted according to JIS K6911.

(ii) Cold shock resistance: A metallic insert formed from a disc in 50 mm diameter and 5 mm thickness attached with notches at two positions was covered with a resin so that the thickness of the resin was 2 mm thick, thereby molding a test specimen. This test specimen was subjected to a heat cycling test of 200 cycles, each consisting of 30-minutes heat exposures at temperature from −40 degree C. to 140 degree C., alternately. Whether or not a cracking occurs was checked every 25 cycles. The number of occurrences of cracking is represented in Table 1.

(iv) Coefficient of thermal expansion: Coefficient of linear thermal expansion at 80° C. to 120° C. was measured by TMA.

Any of Examples 1 to 6 is a molding material in which a novolac type phenolic resin, glass fiber, an inorganic substrate and an elastomer are blended in predetermined amounts. The results shown in Tables 1 and 2 demonstrate that molded products fabricated by molding these molding materials achieved an excellent balance of the mechanical strength, the thermal shock resistance and the stress relaxation at elevated level, which is required for resin pulleys.

On the other hand, Comparative example 1 showed low stress relaxation due to a resol type phenolic resin used therein, although the thermal shock resistance was very excellent. Comparative example 2 was inferior in thermal shock resistance because it lacked an elastomer. Comparative example 3 was inferior in stress relaxation because of large blending amount of the elastomer. The blending amount of the elastomer is important for obtaining a resin molding material which is excellent in a balance of the mechanical strength, the thermal shock resistance and the stress relaxation, and too large blending amounts are not favorable. Preferably, the blending amount of the elastomer is not more than 5% by weight, and a blending amount of not more than 2% by weight will enables the resin molding material to exert its performance more stably. Comparative example 4 was inferior in stress relaxation because of high blending amount of the resin ingredient.

What is claimed is:

1. A phenolic resin molding material for a pulley, comprising:
    (A) novolac phenolic resin,
    (B) glass fiber,
    (C) calcium carbonate, and
    (D) elastomer,
        wherein the proportions of each ingredient, relative to the entire resin molding material are:
    (A) in the range of 29% by weight to 35% by weight,
    sum of (B) and (C) in the range of 55% by weight to 62% by weight, and
    (D) in the range of 0.5% by weight to 5% by weight
        wherein the resin molding material contains no organic fibers, and
        wherein the (D) elastomer comprises acrylonitrile butadiene rubber or polyvinyl butyral.
2. The phenolic resin molding material according to claim 1, wherein
    the proportion of ingredient (D), relative to the entire resin molding material is:
        in the range of 0.5% by weight to 2% by weight.
3. The phenolic resin molding material according to claim 1, wherein
    the proportion of ingredient (D), relative to the entire resin molding material is:
        in the range of 1% by weight to 2% by weight.
4. The phenolic resin molding material according to claim 1, wherein
    the proportions of ingredients (B) and (C), relative to the entire resin molding material are:
        (B) in the range 27% by weight to 50% by weight, and
        (C) in the range of 5% by weight to 33% by weight.
5. A method for using a resin molding material comprising using the phenolic resin molding material according to claim 1 for molding a resin pulley.
6. A resin pulley produced by molding the phenolic resin molding material according to claim 1.

* * * * *